United States Patent [19]

Zahner

[11] 4,116,814

[45] Sep. 26, 1978

[54] METHOD AND SYSTEM FOR EFFECTING CATALYTIC CRACKING OF HIGH BOILING HYDROCARBONS WITH FLUID CONVERSION CATALYSTS

[75] Inventor: John C. Zahner, Princeton, N.J.

[73] Assignee: Mobil Oil Corporation, New York, N.Y.

[21] Appl. No.: 816,849

[22] Filed: Jul. 18, 1977

[51] Int. Cl.$^2$ .................... B01J 8/24; C10G 11/04; C10G 37/02

[52] U.S. Cl. ........................... 208/78; 208/120; 208/155; 208/164; 209/20; 209/138; 252/417; 423/DIG. 16

[58] Field of Search ............... 208/120, 78, 155, 164; 209/20, 138; 423/DIG. 16

[56] References Cited

U.S. PATENT DOCUMENTS

| | | | |
|---|---|---|---|
| 2,349,575 | 5/1944 | Voorhees | 208/149 X |
| 2,483,485 | 10/1949 | Barr | 208/155 X |
| 2,503,291 | 4/1950 | Odell | 23/288 S |
| 2,581,135 | 1/1952 | Odell | 23/288 S |
| 2,602,019 | 7/1952 | Odell | 23/288 S |
| 2,620,313 | 12/1952 | Odell | 23/288 S |
| 2,627,499 | 2/1953 | Krebs | 201/31 |
| 2,631,921 | 3/1953 | Odell | 23/288 S |
| 2,767,126 | 10/1956 | Rice | 208/149 X |
| 3,184,515 | 5/1965 | Penner et al. | 260/658 R |
| 3,296,319 | 1/1967 | Bohl et al. | 260/659 A |
| 3,801,493 | 4/1974 | Youngblood et al. | 208/78 |
| 3,803,024 | 4/1974 | Haunschild | 208/76 |
| 3,849,291 | 11/1974 | Owen | 208/78 |
| 3,926,843 | 12/1975 | Owen | 252/417 |
| 3,970,587 | 7/1976 | Shinnar et al. | 252/417 |

Primary Examiner—Delbert E. Gantz
Assistant Examiner—G. E. Schmitkons
Attorney, Agent, or Firm—Charles A. Huggett; Carl D. Farnsworth

[57] ABSTRACT

A method and system for cracking hydrocarbons with distinct fluid catalyst particles differing in activity, selectivity and physical characteristics is described wherein a common catalyst regeneration system is employed which will measurably contribute to the heat requirements of the operation as well as the activity/selectivity characteristics of the catalyst employed. Except for size, the catalysts upon make-up may have different or identical catalytic characteristics. However, upon contact with a particular hydrocarbon stream, such as vacuum resid, the selectivity and coke producing characteristics of the catalysts may be altered.

16 Claims, 2 Drawing Figures

FIGURE I
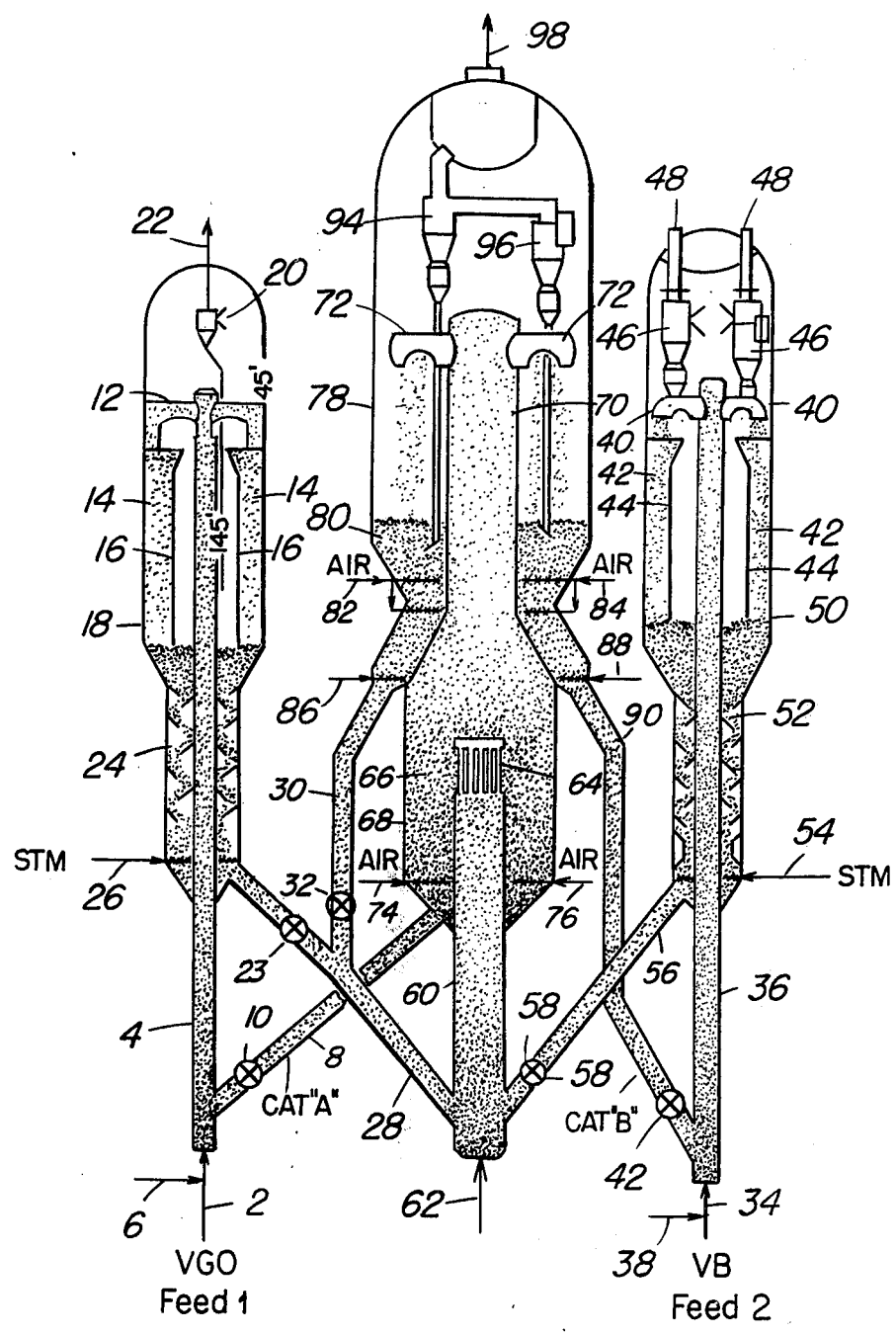

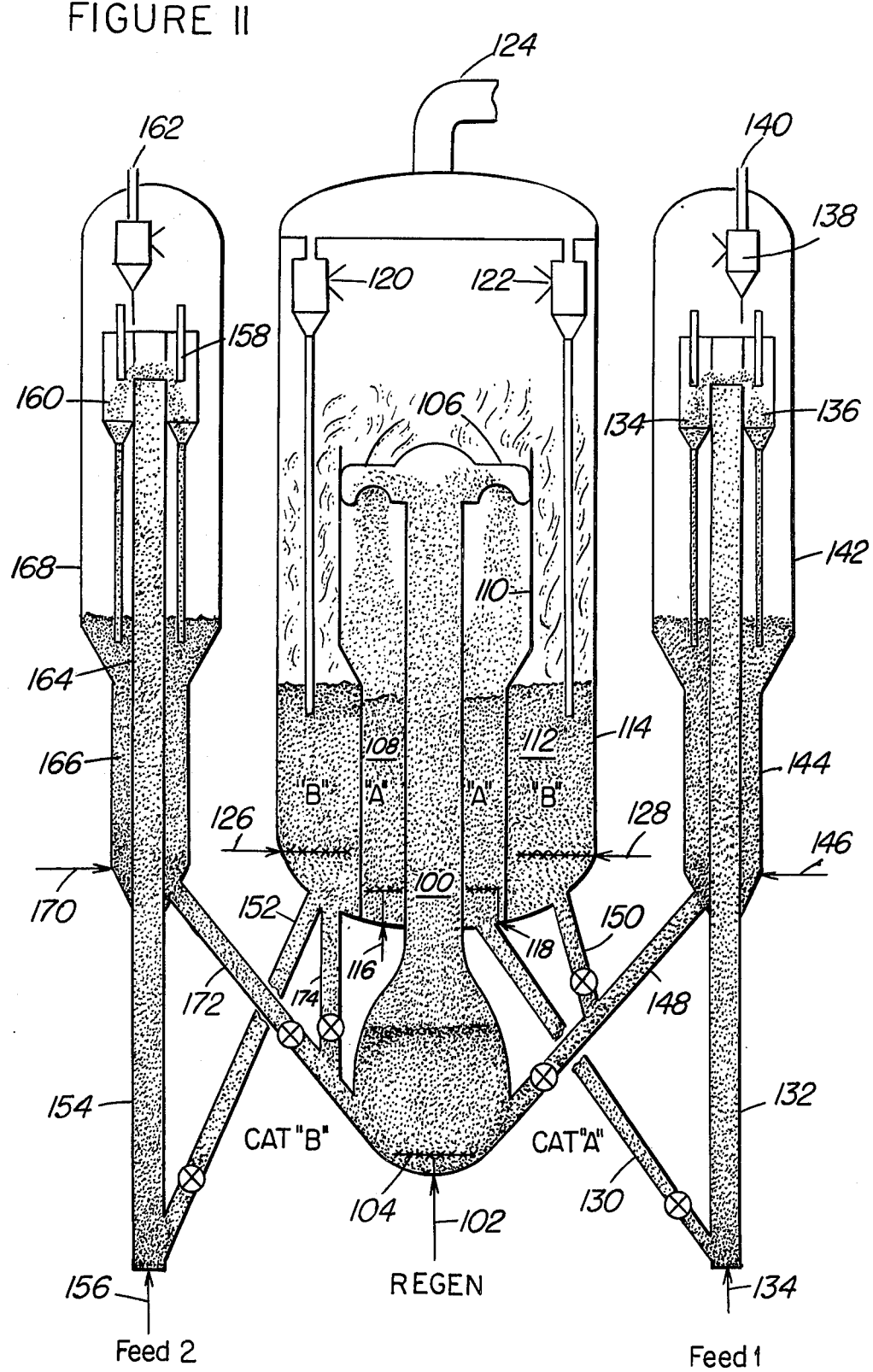
FIGURE II

METHOD AND SYSTEM FOR EFFECTING CATALYTIC CRACKING OF HIGH BOILING HYDROCARBONS WITH FLUID CONVERSION CATALYSTS

BACKGROUND OF THE INVENTION

The field of catalytic cracking and particularly fluid catalyst systems has been in a constant state of development since conception of fluid systems. Thus, as new product demands increased and experience was gained in operating and design parameters, so also were new catalyst concepts developed which further increased needed refinements in cracking technology. With the development of high activity zeolite-type cracking catalysts, the petroleum refiners once again found themselves in need of developing new operating technology. The present invention is concerned with a combination operation relying upon distinct catalyst particles differing in particle size, activity, selectivity and coke producing characteristics, mutually contributing to the catalytic upgrading of separate, relatively high boiling hydrocarbon fractions varying considerably in coke producing characteristics and/or catalyst fouling characteristics.

SUMMARY OF THE INVENTION

This invention relates to a fluid catalyst cracking operation employing catalyst particles varying in size, activity, selectivity and coke containing characteristics which are jointly heated in a catalyst regeneration operation during combustion of carbonaceous deposits under conditions to cooperatively influence the operating function of the catalyst particles when separated on a basis of particle size, activity and selectivity characteristics for effecting the segregated conversion of various crude oil fractions varying in Conradson carbon characteristics, refractory nature, and/or metals content.

More particularly the present invention is concerned with a cooperative arrangement of catalyst handling equipment which will contribute to upgrading hydrocarbon fractions varying substantially in coking characteristics with catalyst particles segregated so that contributing functions of the combination materialize into a novel combination of operating parameters.

The combination operation of the present invention is designed to contribute significantly to refining technology by reducing equipment needed heretofore, and in reducing the catalyst inventory as well as the costs of such operations. In a particular aspect, the combination operation is designed to segregate and process different hydrocarbon feed materials with different particle catalytic materials of the same or different activity/selectivity characteristics so that one portion of a hydrocarbon feed is converted with a catalyst of selected particle size and a different particle size catalyst is employed to convert a higher boiling portion of the feed particularly contributing high coke deposition. The deposition of metal contaminants in the feed will also occur. Catalyst particles of different particle size employed as herein provided are regenerated in a common catalyst regeneration operation under conditions mutually beneficial to each other. That is, catalyst particles laden with a higher level of carbonaceous material in admixture with lower coke containing particles are heated by a controlled burning of the carbonaceous materials in a sequence of catalyst regeneration steps wherein catalyst particles of lower levels of carbonaceous deposits act as a heat sink during combustion of the higher levels of coke deposits on other catalyst particles in the operation. To facilitate the recovery of heat available in such an operation, it is contemplated adding an oxidizing metal component to the catalyst particles and preferably to the catalyst particles of the lower coke producing characteristics when such is available and which will promote the conversion of CO to $CO_2$ during the burning of carbonaceous materials. In addition, it is contemplated treating catalyst particles separated as a function of particle size comprising metal contaminants following the removal of carbonaceous materials under conditions which will reduce the undesirable effects of these metal contaminants during the hydrocarbon conversion operation in which they are employed. Thus, the novel combination of the present invention intends to take advantage of those developments in the prior art which particularly improves the operation herein described.

The present invention particularly concerns a method and system for utilizing two substantially different catalytic materials contributing to the functions of the other within the constraints of the combination. In a more particular aspect, the present invention is concerned with a catalytic conversion method and system comprising at least two separate riser hydrocarbon conversion reactors associated with a common catalyst regeneration system which is operationally enhanced by a catalyst combination comprising large and smaller size catalytic materials working substantially independently of one another in separate riser conversion zones but jointly contributing to the overall processing combination by mutual contact in the common catalyst regeneration system.

The present invention relates to the catalytic contacting of hydrocarbon oils comprising gas oils and higher boiling materials in the presence of finely divided fluidizable catalyst particles varying in size, but of the same or different activity and selectivity characteristics so that fluid catalyst particles of selected size characteristics as well as activity and low coke producing characteristics are relied upon to catalytically convert a hydrocarbon feed of relatively low coke producing characteristics to form desired conversion products in a fluid catalyst conversion zone. Size selected particles of catalysts of the same or lower activity characteristics are relied upon to convert a feed material of higher coking characteristics in a separate conversion zone. Catalyst particles separated from hydrocarbon conversion products of each of the above conversion operations are passed to a common catalyst regeneration zone wherein a burning of carbonaceous deposits is accomplished in the presence of both catalysts so that the low coke containing catalyst and the higher coke containing catalyst are regenerated under conditions contributing to the generation of catalyst particles of desired heat carrying characteristics for use in the combination operation.

The present invention contemplates a regeneration operation wherein smaller size catalyst particles are ultimately separated from larger particles of catalysts by upflowing gaseous material promoting the separation by elutriation. In one embodiment of the combination identified, the smaller catalyst particles comprise the high coke accumulation characteristics and, therefore, are relied upon to supply a major portion of the absorbed catalyst heat by burning during regeneration of the mixture of smaller and larger catalyst particles. In the combination operation of this invention, it is desirable in a specific embodiment that the smaller catalyst particles be relied upon to convert the hydrocarbon feed of the highest coke producing characteristics so that any fines generated from the larger particles of catalyst will find their way during the elutriating particle separation operation in the high coke accumulating and/or metal fouling portion or section of the combination operation.

It is also contemplated using the larger particles as the high coke accumulator. That is, it is contemplated operating the process combination of this invention by having the smaller size catalyst particles as the most active catalytic material for conversion of a low coke producing feed and rely upon larger particles of catalyst of selected pore distribution and of lower activity characteristics particularly for treating a higher coke producing feed comprising metal contaminants in the combination operation.

In either of the catalytic cracking operating arrangements briefly discussed, it is further contemplated using gasiform diluent materials with the separate hydrocarbon feed materials to particularly promote distribution thereof during mixing with catalyst particles to form suspensions thereof ultimately passed upwardly through fluid catalyst conversion operations such as riser reactor conversion zones. The gasiform diluent materials employed may be selected from a relatively large group of materials such as steam, $C_5$ and lower boiling hydrocarbons, lower boiling alcohols and other materials which will particularly contribute mobile hydrogen under the operation conditions employed or carbon-hydrogen fragments which will assist with obtaining the production of lower boiling hydrocarbon products.

In a more particular aspect, the method and system of the present invention is designed to improve upon the use of low coke forming catalysts such as the recently developed crystalline zeolite cracking catalyst of low coke producing characteristics in at least one of the fluid catalyst conversion zones permitting a desired hydrocarbon feed residence time in the range of 1 to 10 seconds under elevated temperature cracking conditions. The present invention is concerned with a method of operation which will circumvent some of the heat sufficiency problems associated with using relatively low coke producing high activity crystalline zeolite cracking catalyst to convert hydrocarbon feeds and fractions thereof identified as of low coke producing characteristics. Thus, the method and system of the present invention relies in a particular embodiment upon the use of dual riser fluid catalyst cracking operation separately and selectively controlled to effect in the presence of small and larger size fluid catalyst particles conversion operations which mutually contribute to the operation of one another, particularly nurtured when regenerated together in a common catalyst regeneration system.

The combination operation of the present invention particularly contemplates the use of different particle size catalyst compositions of the same activity and selectivity characteristics or varying considerably in activity and selectivity characteristics. That is, as mentioned above, it is contemplated employing a catalyst of relatively low activity to accomplish one result and a catalyst of considerably higher activity to accomplish another result. It is therefore contemplated employing either an amorphous or a crystalline zeolite cracking catalyst of reduced activity, particularly for converting a high coke producing feed fraction charged to the combination. A high activity low coke producing amorphous catalyst, a high activity crystalline zeolite or a combination thereof may be the catalyst composition for converting a hydrocarbon feed of the lower coke producing characteristics. That is, it is contemplated employing a catalytically activated crystalline zeolite identified as X or Y type faujasite crystalline zeolites alone or in mixture with another catalytic component of relatively high cracking activity. The faujasite cracking component may be the smaller or larger particle material as the case warrants in order to accomplish the cracking operation desired. Generally, the crystalline zeolite cracking component, because of its lower coke producing characteristics when compared with an amorphous type cracking component, will be of the selected particle size providing high activity for converting the low coke producing feed. The crystalline zeolite cracking component may be one of several different crystalline zeolites known in the art, such as the faujasite type crystalline zeolite mentioned above, mordenite type cracking zeolites, or it may be a zeolite from the class of crystalline zeolites represented by ZSM-5 type crystalline zeolite. ZSM-5 type zeolites having been identified as crystalline zeolites having a pore opening of at least 5 Angstroms, a silica-to-alumina ratio greater than 12 and a constraint index within the range of 1 to 12. The zeolites may be retained as separate particles or in a support matrix material. The smaller size catalyst cracking components may also be low activity crystalline zeolites; also they may be catalysts such as those which have been deactivated after substantial use, they may be an amorphous type silica-alumina cracking components, or a mixture of the two may be employed to provide a less active catalytic cracking component for the combination of this invention. Thus, the catalyst particle size, activity and selectivity characteristics will depend on the mode of operation selected and the refractory nature of the feeds being processed in the separate riser conversion zones.

Processing concepts of this invention are concerned with adjusting and generally optimizing the temperature of the various catalyst hydrocarbon suspensions formed and hydrocarbons converted in the separate catalytic conversion zones. Thus, although various combinations of hydrocarbon feed materials may be employed which are relevant to the concepts of the present invention, it is intended that gas oils and higher boiling products of crude oil fractionation be used to obtain the different hydrocarbon feed components used in the process combination of this invention. The combination may be employed for converting high boiling materials which one might obtain by vacuum distillation such as a vacuum gas oil and a higher boiling vacuum bottoms fraction. Thus, as related to the processing concepts of this invention, a residual fraction of atmospheric distillation and a vacuum bottoms fraction are identified herein as a high coke producing feed and the lower boiling gas oil fraction obtained from either atmospheric or vacuum distillation are referred to herein as a low coke producing feed. It will be recognized by those skilled in the art that this relationship is somewhat hypothetical and that other feed combinations may be selected which will fall within the general concepts of the present invention. It is particularly contemplated when employing products of vacuum distillation and residual oils as the hydrocarbon feed fractions, to combine with either one or both of the hydrocarbon feeds, a gasiform material which will aid with dispersal atomization and/or distribution of the feed in contact with the catalyst particles and this will help to suppress adverse catalyst/oil agglomerating effects obtained in the absence of such gaseous materials which will lead to undesired additive coke depositions on the catalyst particles. Gaseous materials which may be used for this purpose include hydrogen, gaseous hydrocarbon products of cracking, mixtures of low boiling paraffins and olefins generally lower boiling than $C_5$ hydrocarbons, $C_1$-$C_3$ hydrocarbons and lower boiling alcohols.

Regeneration of the catalyst particles separated from the respective hydrocarbon conversion products of cracking in separate reaction zones is accomplished by passing stripped catalyst obtained from each conversion operation at an elevated stripping temperature as a mixture of catalyst particles into a catalyst regeneration operation, generally identified with a system which reduces the overall catalyst inventory of the operation, promotes the combustion of carbonaceous deposits and formed carbon monoxide to carbon dioxide, and promotes particularly the separation of relatively small particles of catalyst from larger particles of catalyst. The present invention relies upon the use of particles of catalyst of selected size and activity to convert a high coke producing feed material and thus to supply a substantial portion if not a major portion of the generated heat to the low-coke containing catalyst particles. Regenerated catalyst particles recovered at an elevated temperature are mixed with spent catalyst particles at a lower temperature as charged to the regeneration system to raise the temperature of the spent catalyst particles to a more desirable carbon burning regeneration temperature. Thus, in one arrangement, the smaller particles in the hot regenerated catalyst mixture are separated by gas flow from the larger particles and a portion thereof are relied upon through mixing therewith to raise the temperature of the contaminated spent catalyst particles to a temperature particularly promoting the combustion of carbonaceous material on the catalyst by burning in the presence of an oxygen containing gas such as air. In some operations, it is desirable to form a catalyst mix temperature which is at least 1000° F. upon initial contact with regeneration gas. On the other hand, when one desires to particularly promote the combustion of carbonaceous material including the conversion of formed carbon monoxide to carbon dioxide, it is more preferable to form a catalyst mix temperature of at least about 1200° F., thereby substantially reducing the burning time to complete the combustion of deposited carbonaceous material and formed carbon monoxide. Thus, the regeneration system of the present invention relies upon the catalyst particles of low coke levels as a heat sink during combustion of carbonaceous material on the particles of catalyst of higher coke level and provides thereafter for a separate withdrawal of the larger particles of catalyst at a desired elevated temperature from the lower portion of a dense fluid bed of regenerated catalyst separately from smaller catalyst particles in the more dispersed phase of catalyst above the dense fluid bed of regenerated catalyst particles. The separation of large and smaller particles of catalyst by elutriation is not novel but is believed to be novel in the operating arrangement of this invention.

It is recognized that utilizing catalyst particles of different particle size or particle size ranges is only one method for accomplishing the results desired within the concepts of the present invention. Besides using catalysts of different size and size ranges, one can also enhance the separation desired between particles by having catalyst particles of different density material or a combination of size and density to achieve and maintain the operation desired in the present combination. The terminal velocity of round catalyst particles in regeneration gas is 2 ft. per sec. for a 250 micron particle and 0.2 ft. per sec. for a 75 micron particle. It is clear, however, that the regeneration gas velocity can be considerably higher (about 1–10 ft. per sec.) as the concentration of particles and other momentum factors are changed and relied upon in the operation. The present dual particle size catalyst conversion operation of different activity-selectivity characteristics can be successfully employed to convert hydrocarbon fractions comprising substantial amounts of metal contaminants, thereby depositing or severely poisoning the catalyst coming in contact therewith. It is known that catalyst severely metal poisoned tend to make relatively large amounts of undesired gaseous products. However, the present operation permits one to reduce this gas making tendency by contacting such a high metals containing feed under relatively low severity conditions. The conversion liquid product of such an operation is recovered and all or a portion of this liquid product is charged to the conversion zone employing the higher activity low coke producing catalyst. Thus, it will be recognized that in such an operation the low activity catalyst contact zone is essentially acting as a guard chamber removing metals and carbonaceous material from the feed in order to prepare a more desirable hydrocarbon feed for contact with the high activity low coke producing catalyst in an adjacent conversion zone. In this combination, regeneration of the different activity catalyst particles in a common regeneration zone provides a most desirable heat distribution arrangement for the recovery and distribution of heat between the high activity catalyst and the catalyst particles containing high coke deposits. Thus, in the combination operation herein discussed, the overall catalyst system may be relied upon to protect the catalysts employed from unnecessary heat damage by distribution in a system more closely in heat balance. One particular advantage of the combination operation of this invention is that the very low coke containing catalyst can now be used to accomplish particularly desired conversion results in a heat deficient operation in combination with a higher coke containing catalyst particularly preparing a more desirable feed material for the higher activity catalyst operation. In yet another embodiment, it is contemplated employing the metals contaminated catalyst to effect relatively high conversion of the relatively high boiling hydrocarbon fraction such as a residual oil, bearing in mind that gas produced can be used to advantage in the refinery operation.

FIG. I is a diagrammatic sketch in elevation of a dual riser conversion operation matched to a common catalyst regeneration system for effecting regenerating of catalyst particles of different coke deposition levels and size separation of regenerated catalyst to accomplish the separate hydrocarbon processing conditions of the present invention.

FIG. II is a diagrammatic sketch in elevation of a combination of riser catalytic conversion zone adjacent to a common catalyst regeneration operation from which heated regeneration catalyst particles of different size and activity characteristics are separately recovered for use in the separate conversion zone.

DISCUSSION OF SPECIFIC EMBODIMENTS

Referring now to FIG. I by way of example, there is diagrammatically shown in elevation in combination with one another, a plurality of riser hydrocarbon conversion zone operationally attached to a common catalyst regeneration system comprising riser and dense fluid catalyst bed regeneration operations. In the specific arrangement of FIG. I, a hydrocarbon feed or fraction identified as feed #1 and comprising a refractory relatively low coke producing feed such as a gas oil or low boiling material of crude oil is admitted by conduit 2 to a riser conversion zone 4. A gasiform diluent material such as steam, low boiling hydrocarbons and lower alcohols may be admitted by conduit 6 for admixture with the feed in conduit 2. In this arrangement, a suitable particle size, high activity, low coke producing catalyst identified as catalyst "A" is admitted to the lower portion of riser 4 by conduit 8 provided with a flow control valve 10. A suspension of catalyst particles in hydrocarbon feed and gasiform diluent material when employed is formed in the lower portion of riser 4 for flow upwardly there-through under catalytic cracking temperature conditions in the range of 900° F. to about 1100° F. depending on the feed charged to the riser. When the feed material is a relatively refractory hydrocarbon feed material, then the operating temperature conditions will more normally be at least about 1000° F. Also the hydrocarbon residence time in the riser will vary with the feed, reaction temperature conditions employed and product desired. With the more refractory feed materials converted to particularly gasoline boiling hydrocarbons, the hydrocarbon residence time will be less than about 10 and more usually in the range of about 4 to 8 seconds. In this specific riser cracking operation, catalyst "A" is chosen to comprise the larger sized catalyst particles of high activity and relatively low coke accumulating characteristics.

The suspension passed through riser 4 under hydrocarbon conversion conditions is discharged through radiating arm means 12. These radiating arm means may be replaced by cyclone separators. The arm means are provided with opening means in the bottom surface thereof for discharging the suspension generally downwardly and into baffle restricted passageways 14 formed by baffle means 16 attached to the wall of vessel 18. Hydrocarbon vapors separated from catalyst discharged from the riser along with stripped products of reaction and stripping gas pass through one or more cyclone separators represented by separator 20 for the recovery of catalyst fines before withdrawal by conduit 22.

The separated catalyst collected in downcomer section 14 passes downwardly into a lower portion of vessel 18 wherein it is counter-currently contacted with stripping gas which is normally steam. The stripping gas is introduced to the lower portion of the stripping zone identified as section 24 by conduit 26. The stripping section is provided with a plurality of downwardly sloping, alternately staggered and spaced apart annular baffle members providing a staggered flow path for counter-current contact of the catalyst with stripping gas. Stripped catalyst comprising relatively small amounts of carbonaceous deposits because of the low coke producing characteristics of the catalyst and feed converted is withdrawn from the stripping section 24 at an elevated temperature below 1000° F. by conduit 28 containing flow control valve 23 for passage to catalyst regeneration. Regenerated catalyst particles comprising catalyst "B" chosen in this arrangement to comprise the smaller catalyst particles at a temperature within the range of about 1250° F. to about 1400° F. and obtained as hereinafter defined are passed by conduit 30 provided with flow control valve 32 for admixture with the catalyst in conduit 28 being passed to the catalyst regeneration operation.

In the specific arrangement of FIG. I, feed #2 is higher boiling than feed #1 and also contributes substantial coke during the cracking operation. Feed #2 is introduced by conduit 34 to the bottom or lower portion of a second riser cracking zone 36. Gasiform diluent material, the same or different than that used with feed #1, may be mixed with feed #2 by conduit 38. Feed #2 with or without gasiform diluent material is admixed in the lower portion of riser 36 with hot regenerated catalyst particles comprising catalyst "B" passed through conduit 90 containing valve 42 before discharge into the lower portion of the riser. The high boiling feed, gasiform diluent and catalyst are mixed to form a suspension at an elevated cracking temperature of at least about 800° F. thereafter passed upwardly through riser conversion zone 36. In this second stage cracking operation, the conditions may be varied considerably depending on the results desired. Thus, if feed #2 is obtained directly from a crude oil high in Conradson carbon, metal contaminants or both of these materials, the cracking operation in riser 36 may be restricted to a guard chamber operation which reduces a substantial portion of these undesirable materials from the feed by deposition of undesired materials in the feed on the "B" catalytic material or a more severe conversion operation may be selected. Mild conversion conditions will provide a product after separation of catalyst therefrom which can be more suitably converted to desired product with a higher activity catalyst. On the other hand, high boiling feed materials of moderate levels of contaminants may be converted to desired products other than gasoline by a temperature selected conversion operation particularly promoted by the catalyst of high or lower activity characteristics. The feed may be converted to mainly gasoline using a contaminated but high activity catalyst. In riser conversion zone 36, the feed #2 is converted at a temperature less than about 1100° F. during a hydrocarbon residence time generally of the same or longer or shorter duration than employed in riser 4 processing feed #1. On the other hand, at the lower temperature conversion conditions below about 950° F., a more dense upflowing catalyst phase may be employed, the hydrocarbon residence time in riser 36 may be longer than that employed in riser 4 and thus a longer contact time in excess of about 10 seconds may be employed. With a metals contaminated catalyst, the conversion conditions may be selected to produce gasoline or be effected under more moderate conversion conditions.

The suspension in riser 36 is separated from catalyst material in a manner similar to that discussed with respect to riser 4. Thus, the suspension in riser 36 is discharged through radiating arms 40 and generally downward so that the catalyst is collected in downcomer passageways 42 formed by baffles 44. Vaporous conversion products, diluent and stripping gas separated from the particles of catalyst pass through one or more separators represented by separators 46 for the recovery of entrained catalyst fines from product vapors. Separated product vapors are withdrawn by conduits 48.

The catalyst particles separated from hydrocarbon product vapors passes downwardly through the downcomer zone into the lower portion of vessel 50 comprising a catalyst stripping section 52. The collected catalyst moves generally downward through the stripping section and counter-current to stripping gas introduced by conduit 54. The stripped catalyst "B" is withdrawn from the lower portion of the stripping zone by conduit 56 containing a flow control valve 58.

It is clear from the above discussion that the feed materials charged as feed #1 and feed #2 may be selected from a wide variety of composition for upgrading within the operating concepts of this invention. For example, in a specific embodiment, feed #1 may be an atmospheric gas oil of crude distillation having an end point boiling within the range of 800° F. to about 950° F. depending upon the source of the crude oil with feed #2 comprising the remaining residual portion of the crude oil boiling above the separated gas oil fraction. It is, therefore, contemplated, depending on the coking characteristics and metal contaminants of the feed, to eliminate the vacuum distillation operation which has been heretofore a part of most refinery operations.

On the other hand, it is contemplated using the processing arrangement of the present invention to particularly process a vacuum gas oil as feed #1 and a vacuum bottoms fraction as feed #2. Other variations on feed compositions processed may be selected without departing from the scope and essence of the present operating concepts.

Regeneration of the high activity and lower activity catalyst particles in a common catalyst regeneration operation may be practiced as particularly discussed below with respect to FIGS. I and II. In the arrangement of FIG. I, the catalyst particles contaminated with carbonaceous deposits and recovered from the above discussed cracking operation are preferably mixed with a portion of the hot regenerated catalyst particles obtained as hereinafter provided to raise the temperature of the catalyst mixture to at least about 1000° F. upon contact with an oxygen containing regeneration gas. Normally the regeneration gas will be preheated to an elevated temperature of at least about 600° F. before being passed in contact with the catalyst mixture. In the arrangement of FIG. I, the catalyst mixture is passed to the lower portion of an upflowing catalyst particle regeneration zone herein referred to as a riser regeneration zone 60. The upflowing suspension of catalyst in regeneration gas may be as an upflowing relatively dense mass of catalyst particles in regeneration gas or a more dispersed catalyst phase upflowing suspension may be relied upon for the initial regeneration step. That is, the concentration of catalyst particles in upflowing regeneration gas may be within the range of 10 to 30 pounds per cubic feet. The suspended catalyst particles in riser 60 admixed with regeneration gas admitted by conduit 62 at an elevated temperature of at least 1000° F. initiates burning of the carbonaceous deposits on the catalyst particles before discharge from the upper end of capped riser 60 through a plurality of elongated slot openings 64 in the upper periphery of riser 60. The top of riser 60 is capped in the specific arrangement of the figure so that the slot opening operates to direct the discharged suspension generally radially outward therefrom and preferably into a dense fluid bed phase of catalyst particles 66 housed in the lower portion of a regeneration section identified with wall section 68. The discharge end of riser 66 may be in the interface between the dense and dispersed phase of catalyst, below or above a mid section of the dense fluid catalyst bed 66. In the specific arrangement of FIG. I, the discharge of riser 66 is about the dense fluid bed interface of catalyst bed 66 and generally below the more dispersed phase of catalyst particles passing upwardly through a more restricted cross-sectional portion of the regeneration vessel identified with wall section 70.

In the regeneration system and method of operation of FIG. I, the mixture of large and smaller particles of catalyst discharged from riser 60 into bed 66 are caused to be separated by the flow of regeneration gas employed so that the smaller particles of catalyst pass overhead into a more dispersed phase of catalyst which is caused to pass upwardly through the restricted section 70 for discharge by radiating arms 72. The larger particles of catalyst discharged from riser 66 are separated from the smaller catalyst particles and move generally downward and counter-current to regeneration gas introduced to the annular bed by regeneration gas or air inlets 74 and 76. Combustion of carbonaceous material is completed essentially in the annular fluid bed of the larger particles of catalyst before withdrawal by conduit 8 for use as above provided. In this regeneration arrangement, the larger particles of catalyst act as a heat sink during combustion of carbonaceous material and thus may be heated to an elevated temperature within the range of about 1300° F. up to about 1400° F. or in some cases as high as about 1600° F.

In the upper portion of dense fluid catalyst bed 66, the mixture of large and smaller particles of catalyst are subjected to elevated temperature coke burning conditions during the transition and/or separation of large and smaller particle material by elutriation to form a dispersed catalyst phase above a more dense fluid bed phase of catalyst particles. Thus, by carefully selecting the regeneration gas velocity employed in riser 60 and that introduced by conduits 74 and 76, the smaller particles of catalyst may be carried overhead through riser section 70 to discharge arms 72. Riser section 70 with discharge arms 72 are confined within a portion of the regeneration vessel system identified by wall 78. Vessel section 78 is relied upon to collect the smaller particle catalyst phase of the operation as a relatively dense fluid bed of catalyst particles 80. Additional regeneration gas or air may be introduced to a lower portion of bed 80 by conduits 82 and 84. On the other hand, a stripping or fluidizing gaseous material may be added by conduits 82 and 84 in the event that further burning of carbonaceous material is not required in bed 80. Under some conditions, it may be desirable to heat soak the particles of catalyst comprising bed 80 with oxygen rich gas with or without metal deactivating additives to reduce undesirable effects of metal contaminants such as nickel, vanadium and copper. In any of the above operations, stripping of the catalyst may be particularly desired and may be accomplished by adding stripping gas by way of conduits 86 and 88. It is contemplated, on the other hand, carrying the upper level of collected catalyst within the upper enlarged portion of standpipes 30 and 90 above stripping gas inlets 86 and 88. By so restricting the upper level of collected catalyst to reside in an upper portion of the standpipes 30 and 90, the catalyst inventory of the regeneration system is substantially reduced. Furthermore, the pressure head developed by the catalyst passed through each standpipe may be reduced. On the other hand, it may be desirable to aerate the catalyst above the flow control valves in each catalyst standpipe comprising the combustion system and such aeration gas may be added to a standpipe by one or more gas inlets not shown. In this arrangement, the smaller particles of catalyst at an elevated temperature within the range of about 1300° F. up to about 1400° F. and in some cases up to as high as about 1600° F. are withdrawn by conduit 30 for admixture with the larger catalyst particles in conduit 26 to form a suspension with the larger particles at a temperature of at least 1000° F. To accomplish this mixing, the lower portion of standpipe or conduit 28 may be larger in diameter than an upper portion thereof. The smaller particles of regenerated catalyst are withdrawn by standpipe conduit 90 containing a flow control valve 42 for passage to a bottom portion of riser 36 and use therein as discussed above.

In vessel section 78 about the upper end of riser 70, catalyst particles are separated from regeneration gas by a combination of one or more separating arrangements comprising hindered settling, cyclonic separating means, radiating arm means and a combination thereof which cause catalyst particles to be concentrated as a stream of particles separated substantially from regeneration flue gas. Separated catalyst may be passed into a baffled downcomer zone similar to that employed in the hydrocarbon-catalyst separation arrangement discussed above. Regeneration flue gases separated from the smaller particles of catalyst may be passed through one or more connected cyclonic separating means 94 and 96 positioned in the upper portion of the vessel and withdrawal therefrom as by conduit means 98. Catalyst diplegs attached to each cyclone separator pass separated catalyst fines to the collected catalyst in the lower portion of the vessel.

Referring now to FIG. II by way of example, there is shown a variation on the arrangement of FIG. I particularly with respect to the regeneration system and its method of operation. That is, in the FIG. II arrangement, spent catalyst comprising the large catalyst particles and the smaller catalyst particles, one or both streams being mixed with hot regenerated catalyst particles are passed to a large bulb portion of a riser regeneration operation zone 100 wherein the catalyst mixture at an elevated regeneration temperature of at least 1000° F. is initially contacted with regeneration gas such as air introduced by conduit 102 to an air distributor grid 104 positioned in the lower portion of a dense fluid bed of catalyst particles in the bulb portion of the regenerator. The mixture of catalyst particles of high and lower coke deposits are heated by burning deposited carbonaceous material with oxygen containing regeneration gas as the catalyst and regeneration gas pass upwardly through the dense fluid catalyst bed into a more dispersed catalyst phase there-above. The suspension in the dispersed phase is passed upwardly through the upper restricted cross-sectional portion of the first stage regeneration operation and is thereafter discharged through radiating arm means 106 attached to the upper most end thereof. The dispersed phase suspension may be supplemented with oxygen containing regeneration gas by means not shown to promote the flow of the suspension as well as the combustion of formed CO to $CO_2$.

The suspension of large and smaller particles discharged by radiating arms 106 are caused to separate and segregate into a bed of relatively large particles of catalyst 108 in an inner annular zone formed by a cylindrical baffle means 110 open at its upper end so that smaller catalyst particles may pass overhead and be collected as a separate second annular bed of catalyst particles 112 about the first annular catalyst bed. The second separate annular collection zone is formed between cylindrical baffle 110 and the vessel wall 114. Thus, the mixture of catalyst particles initially charged to the bulb portion of the riser regenerator are discharged from the upper portion of the dispersed catalyst phase into the first annular zone and separated by upflowing gaseous material therein to form a separate annular bed of large catalyst particle material in a lower portion of the first annular zone. In the catalyst regeneration-separation sequence above identified, the particles of catalyst are heated by the burning of carbonaceous material and formed carbon monoxide. Depending on the operating conditions employed, all or a portion of the combustible material may be burned in the bulb-riser regenerator arrangement before separation into catalyst systems comprising large size particles of high activity separate from smaller size particles of lower activity collected in the outer most annular zone. On the other hand, catalyst "A" comprising the larger particle catalyst collected as bed 108 may be contacted with a fluidizing gaseous material introduced to a lower portion of the bed by conduits 116 and 118. This gaseous material may be a relatively inert fluidizing gas under the conditions employed, an oxygen containing regeneration or any other suitable material for the purpose. Catalyst "B" comprising the smaller particles of less active catalytic material is carried overhead from the first annular zone by the fluidizing gaseous material for collection in the second annular zone. The smaller particles thus fluidized are separated at least in part by a plurality of cyclone separators 120 and 122 particularly associated with and positioned in an upper portion of the second annular zone. Some of the smaller particles of catalyst settle out without passing through the cyclones. The catalyst particles thus separated from fluidizing gas and/or combustion flue gas in cyclones 120 and 122 are passed by diplegs provided into the second annular fluid bed 112 comprising the smaller particle, catalyst "B". Flue gases and/or fluidizing gas of each of these operations are withdrawn from the top of the regenerator vessel by conduit 124 in communication with cyclone separators 120 and 122. Catalyst bed 112 is maintained in a dense fluid condition by charging gaseous material to the lower portion thereof by conduits 126 and 128. The fluidizing gas introduced by conduits 126 and 128 may be oxygen containing regeneration gas in the event that residual coke remains on the less active catalyst particles and removal is required. On the other hand, because this low activity catalyst will be subjected during the hydrocarbon conversion operation to metal contaminated material, it may be desirable to heat soak the catalyst at an elevated temperature with an oxygen rich gas under elevated temperature conditions above 1000° F. to reduce the effect of the metal contaminants in the hydrocarbon conversion operation.

Catalyst "A" collected as bed 108 and comprising the high activity catalyst particles is withdrawn by standpipe 130 for discharge into a bottom portion of riser reactor 132 under conditions to form a suspension with a selected boiling range hydrocarbon feed at an elevated temperature suitable for converting the feed. Temperatures suitable for this purpose fall within the range of 900° to 1200° F. and more usually are within the range of 980° F. to about 1050° F. Preheating the feed charged and mixing the feed with diluents as discussed above is also contemplated. The suspension passes upwardly through the riser under temperature and hydrocarbon residence time conversion conditions desired. In the arrangement of FIG. II, a suspension in riser 132 is passed directly into cyclonic separating means 134 and 136 attached to the end of riser 132. These cyclone separators may be relatively rough separators or a combination of sequentially connected cyclone separators. They may be replaced by the separating arrangement discussed with respect to FIG. I. Additional cyclonic separating means 138 are provided for separating catalyst fines from hydrocarbon product vapors before removal by conduit 140 for passage to fractionating equipment not shown.

Catalyst particles separated by any one of the means herein discussed are collected in the lower portion of vessel 142 for passage downwardly through a catalyst stripping section 144. Stripping gas such as steam is introduced to the stripper by conduit 146. Stripped catalyst is conveyed by standpipe 148 to the bulb portion of the regenerator vessel 100. In order to raise the temperature of the stripped catalyst in standpipe 148, hot regenerated catalyst "B" particles may be withdrawn by conduit 150 from bed 112 for admixture with the spent catalyst in standpipe 148.

Regenerated catalyst "B" is also withdrawn from bed 112 by standpipe 152 for passage to the bottom portion of riser 154 to which feed #2 is charged by conduit 156. Feed #2, normally higher boiling than feed #1 and comprising a high carbon producing feed such as residual oil or vacuum tower bottoms with or without metal contaminants, may be combined with a diluent gasiform material as discussed above to aid with dispersal and distribution of the heavy feed in contact with catalyst "B". A suspension is thus formed at a temperature of at least 800° F. which is thereafter passed upwardly through the riser conversion zone for a desired hydrocarbon residence time. Conversion desired and composition of feed #2 will control the method of operating riser 154 and this may be in accordance with that discussed above with respect to FIG. I. The suspension formed and passed upwardly through riser 154 as a dense or dispersed phase suspension is discharged from the upper portion of the riser directly into cylcone separators 158 and 160 attached thereto wherein a separation is made to recover catalyst particles from hydrocarbon conversion products. Hydrocarbon conversion products are recovered by conduit 162 after passing through a suitable arrangement of cyclone separators. A common product fractionation system not shown may be used to separate the hydrocarbon products recovered from the operation by conduits 140 and 162. The separated catalyst particles are recovered as a bed of catalyst 164 which moves downwardly through a stripping zone 166 comprising the lower portion of vessel 168. Stripping gas is passed to a lower portion of the stripping zone by conduit 170. The stripped catalyst is passed by conduit 172 to the bulb portion of the regenerator after admixture with hot, freshly regenerated catalyst particles in standpipe 174.

The arrangements of FIGS. I and II permit innovative modification in the systems in several different respects without departing materially from the processing concepts of this invention and particularly the catalyst regeneration systems discussed. Thus, it is contemplated housing the upper end of each riser reaction zone in a common catalyst collecting vessel and comprising separating means for recovering gasiform material from catalyst particles. In yet another arrangement comprising variations on the catalyst regeneration system of FIG. I, it is proposed to modify the bottom portion of riser 60 to comprise an enlarged bulb portion such as identified with FIG. II. It is also contemplated passing the dispersed catalyst phase in the upper restricted section 70 of regeneration vessel 68 through a more restricted transport conduit communicating with cyclonic separating means, thereby eliminating the upper vessel means 78. In this arrangement, the overall height of the regeneration system may be reduced and standpipes extending downwardly from the cyclone arrangement may be joined and separated as required to provide the catalyst streams desired of, for example, catalyst "B".

The catalysts employed in the combination operation of this invention are not intended to be restricted to large and smaller catalyst particle materials of the same composition even though such may occur to some extent in the operation. The catalyst may be of dissimilar compositions so that the activity-selectivity characteristics of the individual catalysts "A" and "B" can be particularly selected to accomplish the conversion operation desired. For example, it is contemplated using as the low activity catalyst particles, materials which are amorphous as well as materials which are crystalline. The lower activity catalyst material may be selected from particular crystalline zeolite compositions of significantly reduced activity and selectivity characteristics. That is, the smaller particle catalytic material may be a relatively spent and catalytically deactivated amorphous or crystalline zeolite catalyst or mixtures thereof. Mordenite catalyst compositions employed alone or in admixture with amorphous material may be employed as the low activity composition. The larger catalyst particles are selected from catalyst compositions of higher cracking activity and selectivity characteristics which are known and referred to as relatively low coke producing catalysts. The higher activity catalyst particles are preferably zeolites or a mixture of crystalline zeolites which particularly promote the cracking or conversion operations desired of the lower boiling feed charged to the combination operation. For example, large catalyst particles may be a homogenous mixture of a catalytically activated faujasite crystalline zeolite in combination with one of a crystalline zeolite selected from the class of crystalline zeolites identified as erionite, zeolite T, chabazite, Z-5 zeolite, mordenite, ZSM-5, ZSM-11, ZSM-12, ZSM-35, ZSM-38 and ZSM-41. Of particular interest for use as the highest activity catalyst particles, whether large or small, is the catalyst combination comprising high activity faujasite crystalline material in admixture with a ZSM-5 type of crystalline zeolite.

Having thus generally discussed the method and concepts of this invention and specifically described examples in support thereof as represented by FIGS. I and II, it is to be understood that no undue restrictions are to be imposed by reason thereof except as defined by the following claims.

I claim:

1. In a process for converting hydrocarbons with fluid particles of catalyst and regenerating the catalyst particles by burning carbonaceous deposits on the catalyst in an adjacent catalyst regeneration thereby heating the catalyst particles to an elevated temperature before recycle to said hydrocarbon conversion operation, the improvement which comprises providing at least two separate catalyst conversion zones for processing hydrocarbon fractions of different boiling range and coke producing characteristics, converting a low coke producing first hydrocarbon fraction in the presence of a first mass of active crystalline zeolite fluid particles of catalyst of selected activity and physical characteristics under elevated temperature conversion conditions, converting a second hydrocarbon fraction of higher coke producing characteristics in the presence of a second mass of active crystalline zeolite fluid particles of physical characteristics different from said first catalyst mass, recovering catalyst particles from each of said conversion operations comprising different amounts of carbonaceous deposits of said conversion, recovering hydrocarbon conversion products of each of said hydrocarbon conversion operations, passing said recovered catalyst comprising catalyst of said first and second mass of catalyst particles in admixture with one another into a catalyst regeneration under conditions selected to heat said mixture of particles of catalyst to an elevated temperature above 1200° F. by burning said carbonaceous deposits, separating by elutriation in said regeneration zone said first mass of fluid particles from said second mass of fluid particles, recovering one of said catalyst masses from an upper portion of the regeneration zone and the other from a lower portion of the regeneration zone, recycling the separately recovered regenerated first and second mass of catalysts to the conversion zone from which obtained and recycling a portion of one of said first and second mass of catalyst particles recovered from said regeneration zone to said catalyst regeneration operation for admixtures with particles of catalyst containing carbonaceous deposits being regenerated in said catalyst regeneration operation.

2. The process of claim 1 wherein the hydrocarbon fractions to be converted comprise a relatively low boiling refractory hydrocarbon material fraction and a higher boiling residual fraction of higher coke producing characteristics than said lower boiling fraction, said low boiling hydrocarbon fraction is converted in the presence of a mass of high activity catalyst of selectivity characteristics restricting the level of carbonaceous material deposited upon the catalyst and said higher boiling fraction is contacted with another mass of the catalyst particles of activity and selectivity characteristics promoting the deposition of carbonaceous material on the catalyst particles.

3. The process of claim 1 wherein one mass of catalyst particles is of a larger particle size than the other names of catalyst particles and smaller catalyst particles are relied upon to convert the hydrocarbon fraction having the highest coke producing characteristics under the operating conditions employed.

4. The process of claim 1 wherein the particles of catalyst are initially of the same composition.

5. The process of claim 1 wherein the particles of catalyst comprising the first mass and the second mass are of a different composition except for attrited fines of the larger particles of catalyst remaining with the finer mass of catalyst in the cyclic system.

6. The process of claim 1 wherein the lower boiling hydrocarbon fraction is converted with a mass of high activity catalyst of large particle size and the residual hydrocarbon fraction is converted with smaller particle size catalyst of lower activity characteristics.

7. The process of claim 6 wherein the high activity catalyst particles comprise one or more crystalline zeolite catalyst compositions.

8. The process of claim 2 wherein the residual oil comprises a high boiling portion of crude oil comprising metal contaminants.

9. The process of claim 2 wherein the low boiling hydrocarbon fraction is a vacuum gas oil.

10. The process of claim 2 wherein the higher boiling fraction is a vacuum tower bottoms.

11. The process of claim 2 wherein a crude oil is separated to provide said low boiling and said higher boiling hydrocarbon fractions.

12. The process of claim 1 wherein regeneration of the mixture of spent and regenerated catalyst particles is accomplished in a sequence of upflowing catalyst regeneration stages in which one of the stages is relied upon to separate a mass of the smaller catalyst particles from the larger mass of catalyst particles.

13. The process of claim 12 wherein a suspension comprising catalyst, regeneration gas and combustion products of regeneration are discharged from a first stage of catalyst regeneration into a relatively dense fluid bed of catalyst in a second stage of catalyst regeneration below a dispersed phase of catalyst comprising the finer mass of catalyst particles therein.

14. The process of claim 12 wherein a suspension comprising catalyst, regeneration gas and combustion products of regeneration are discharged from said first stage into said second stage and above a more dense fluid bed of catalyst in said second stage.

15. The process of claim 12 wherein the first stage of catalyst regeneration comprises an upflowing relatively dense fluid mass of catalyst particles in combustion supporting gas thereafter discharged into a second catalyst in a bottom portion of a regeneration zone comprising an upflowing mass of catalyst fines and a downflowing mass of catalyst particles of large particle size and passing oxygen containing regeneration gas upwardly through said second catalyst regeneration zone.

16. The process of claim 12 wherein catalyst particles of the smaller size separated from the regeneration operation at an elevated temperature above 1200° F. are admixed with each spent catalyst stream of small and larger catalyst particle size before contact with regeneration gas in the lower portion of said first stage of catalyst regeneration.

* * * * *